O. SCHELLERT.
TOASTER.
APPLICATION FILED AUG. 3, 1907.
932,584.
Patented Aug. 31, 1909.
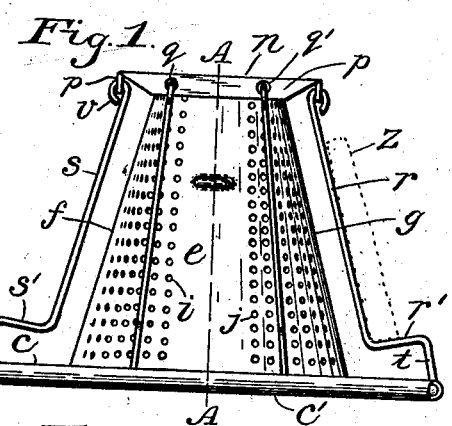
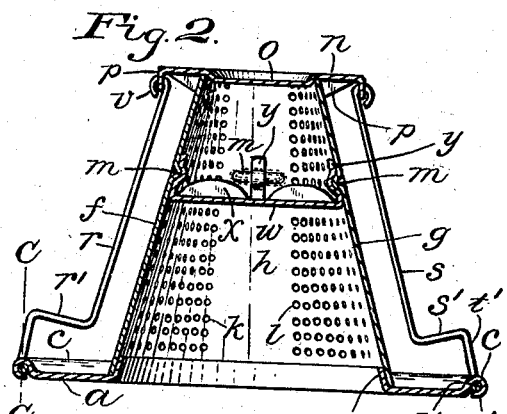
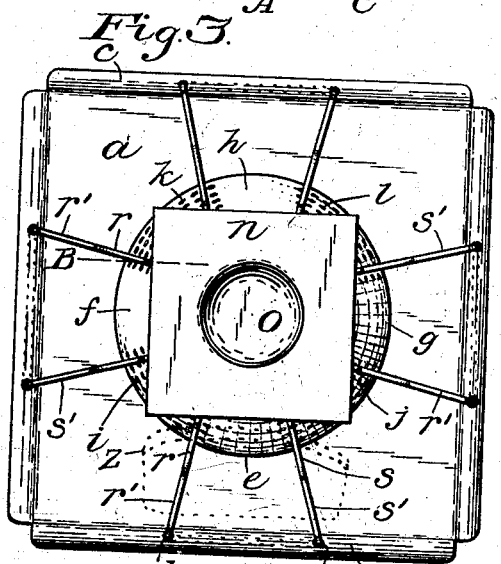
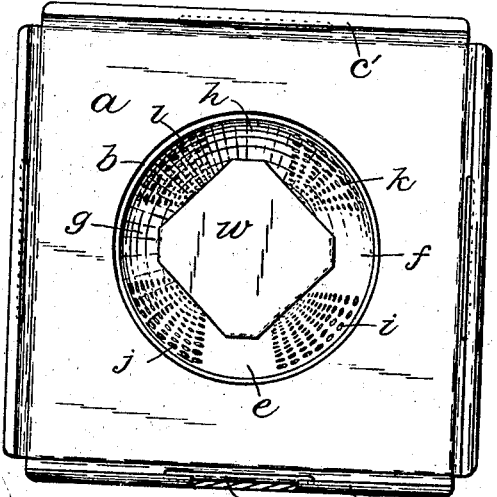
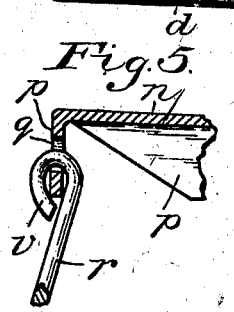
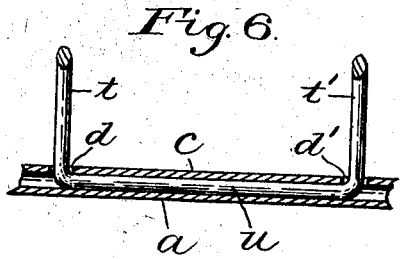
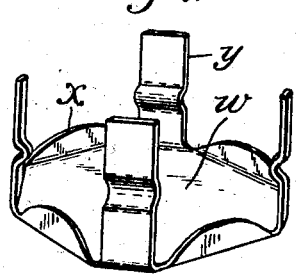
WITNESSES:
J. H. Gardner.
M. D. Beaty.
INVENTOR:
Otto Schellert,
BY E. T. Silvius,
ATTORNEY.

UNITED STATES PATENT OFFICE.

OTTO SCHELLERT, OF INDIANAPOLIS, INDIANA.

TOASTER.

932,584.  Specification of Letters Patent.  Patented Aug. 31, 1909.

Application filed August 3, 1907. Serial No. 386,910.

*To all whom it may concern:*

Be it known that I, OTTO SCHELLERT, a citizen of the United States, residing at Indianapolis, in the county of Marion and State of Indiana, have invented certain new and useful Improvements in Toasters; and I do declare the following to be a full, clear, and exact description of the invention, reference being had to the accompanying drawings, and to the letters of reference marked thereon, which form a part of this specification.

This invention relates to the class of devices which are used upon stoves for toasting bread and similar articles of food, the invention having reference particularly to a toaster that is adapted to be placed over the flame of a gas burner or the burner of a gasolene stove or oil stove, and which may be used also on stoves using other kinds of fuel, the present invention however, being designed more particularly with a view to using it where circular burners are used.

The object of the invention primarily is to provide a toaster which will have the greatest efficiency with the minimum consumption of fuel and yet be adapted to be constructed at the minimum cost, the object specifically being to construct the toaster of the fewest number and most simple forms of parts in such manner as to eliminate supplementary parts which have heretofore been required for the distribution of heat, a further object being to provide a toaster which may be used for either heating or cooking purposes as may be desired, and further to provide a toaster that will be stable in construction and durable and economical in use.

Referring to the drawings Figure 1 is a side elevation of the toaster constructed substantially in accordance with the invention; Fig. 2, a vertical sectional view thereof on the line A A in Fig. 1; Fig. 3, a top plan view; Fig. 4, a bottom plan view partially broken away; Fig. 5, a fragmentary sectional view as at the line B in Fig. 3; Fig. 6, a fragmentary sectional view as on the line C C in Fig. 2; and, Fig. 7, a perspective view of the deflector which may be connected removably in the combustion chamber of the toaster.

Similar reference characters in the several figures of the drawings designate like elements or features of construction.

The improved toaster comprises a frame having a base $a$ which is preferably rectangular in plan and has a central circular opening around which is an upturned flange $b$, the extremities of the base having four straight edges, the edge portions being curved upwardly to form beads $c$, and downwardly to form lips $c'$, each bead having two guide holes $d$ and $d'$ in the tops thereof.

The combustion chamber has a wall composed of a single thickness of metal and is circular, one end being greater in diameter than the other end, and the larger end placed upon the base $a$ and extending about the flange $b$ whereby the wall is retained in central position on the base. The wall has four separate imperforate portions $e$, $f$, $g$, $h$ which are opposite to the middle portions of the straight beaded edges of the base, and between the imperforate portions are four portions having perforations, as $i$, $j$, $k$, $l$, the perforations being in four groups and the groups being opposite to the corners of the base. The perforations permit the oxygen of the atmospheric air to mix with the flames so as to aid in producing more perfect combustion than will take place behind the imperforate portions of the wall, so that the perforate portions will become heated to redness and therefore radiate a higher degree of heat than will be radiated from the imperforate portions which do not become heated to the degree of redness with an economical rate of consumption of the fuel. Each imperforate portion of the wall has a projection $m$ on its inner side, somewhat near the top thereof which may suitably be struck up from the metal.

A square top $n$ is provided which has a central circular depression $o$ fitting into the top of the wall of the combustion chamber, whereby the two elements are joined together, the top having four downwardly extending flanges $p$, each flange having two apertures $q$ and $q'$.

The toaster has four pairs of supports upon which to place the bread or other article to be toasted, and are arranged at the middle portions of the straight beaded edges of the base and connected thereto and extending upward to the top and connected thereto, each pair of supports being composed of a single piece of wire having two slightly inclined members $r$ and $s$, at the bottoms of which are slightly inclined cross bars $r'$ and $s'$ to which are joined upright members $t$ and $t'$, the latter extending through the apertures $d$ and $d'$ and being joined by a base bar $u$ which extends under the bead $c$, and is engaged by the lip $c'$, the extremities of the wire being turned over through the apertures $q$ and $q'$ so as to form a hook $v$ on the upper end portion of each member $r$ and $s$ connecting the same with a flange $p$ of the top.

The deflector comprises a plate $w$ which has four flanges $x$ turned up, and between each two flanges a spring finger $y$ is formed which also extends upwardly, and the spring fingers are adapted to engage the wall of the combustion chamber at the inner sides of the imperforate portions and also engage the projections $m$ for removably holding the deflector, the four portions of the plate $w$ on which the flanges $x$ are formed, having no contact with the wall so that some of the heat of combustion may rise freely above the plate $w$ along the portions of the wall that has the perforations therein, and by the use of the deflector the heat will be deflected so that the top $n$ will not become excessively hot and will permit articles to be warmed or kept warm upon the top of the toaster, while on the other hand if the deflector be removed, the top $n$ will become sufficiently hot to permit of cooking to be done thereon.

In practical use four slices of bread or similar article of food may be placed on the toaster at one time. Each slice as indicated by $z$ and shown by dotted lines in Figs. 1 and 3 is to be placed on a pair of inclined members $r'$ and $s'$ so as to lean against the members $r$ and $s$, and the slice will be relatively closer at its middle portion to the imperforate portion of the wall of the combustion chamber than its end portions will be to the perforate portions of the wall. Only sufficient heat will be generated by proper regulation to suitably heat the imperforate portion without scorching the article, and the degree of heat necessary to toast the slice uniformly will be automatically regulated at the perforate portions which recede from the slice by reason of the higher degree of heat resulting from more perfect combustion, due to the free admixture of the ignited gases passing through the perforations with the atmospheric air, and the area of metal between the perforations being less than the area of the imperforate portions per square inch permits the heat of combustion to raise the temperature of the perforate portions to a higher degree than that of the imperforate portions, so that the heat will be approximately uniform on all portions of the surface of the slice of bread, notwithstanding the end portions are not as close as the middle portions to the wall of the combustion chamber.

When the deflector is used the heat will be deflected to some extent outwardly beyond the top $n$ so that if a pan be placed upon the top, the toasted bread or other articles or crackers may be heated on the plate or kept warm, and if it be desired to make coffee or tea while toasting the bread the deflector may be removed so that all of the heat will rise directly to the top $n$ and permit of various cooking operations thereon.

Having thus described the invention, what is claimed as new is—

1. In a toaster of the character described, the combination with an apertured base, a top, and supports connected to the base and also to the top, of a combustion chamber wall on the base and in engagement with the top, the wall comprising imperforate portions and alternate perforate portions, and a deflector supported against the inner side of said wall in proximity to said top and having portions that engage said imperforate portions and having also portions that extend across said perforate portions free from contact therewith.

2. In a toaster of the character described, the combination with a base, a top, and supports connected to the base and the top, of a combustion chamber wall on the base and in engagement with the top and having four projections formed on the inner side thereof, said wall having perforate portions between said projections, and a deflector comprising a plate having four upturned flanges thereon and a spring finger between each two flanges extending upward, said fingers engaging said wall and said projections, the portions of the plate on which the said flanges are formed extending opposite to the wall free from contact therewith.

In testimony whereof, I affix my signature in presence of two witnesses.

OTTO SCHELLERT.

Witnesses:
Wm. H. Payne,
E. T. Silvius.